United States Patent [19]

Rivers

[11] Patent Number: 5,615,301
[45] Date of Patent: Mar. 25, 1997

[54] AUTOMATED LANGUAGE TRANSLATION SYSTEM

[76] Inventor: W. L. Rivers, P.O. Box 328, Verona, N.J. 07044

[21] Appl. No.: 313,785

[22] Filed: Sep. 28, 1994

[51] Int. Cl.⁶ ........................................... G10L 3/00
[52] U.S. Cl. .................... 395/2.86; 395/2.79; 395/2.69; 395/2.63; 395/2.44; 395/752; 395/753
[58] Field of Search .................. 395/2.86, 2.79, 395/2.69, 2.6, 2.63, 2.44; 381/43, 44, 52; 364/419.02, 419.01, 419.03, 419.08, 419.16

[56] References Cited

U.S. PATENT DOCUMENTS

| | | | |
|---|---|---|---|
| 4,481,593 | 11/1984 | Bahler | 395/2.62 |
| 4,730,270 | 3/1988 | Okajima et al. | 364/419.02 |
| 4,852,170 | 7/1989 | Bordeaux | 395/2.86 |
| 4,864,503 | 9/1989 | Tolin | 364/419.02 |
| 4,984,177 | 1/1991 | Rondel et al. | 395/2.86 |
| 5,091,950 | 2/1992 | Ahmed | 395/2.86 |
| 5,490,061 | 2/1996 | Tolin et al. | 364/419.02 |

FOREIGN PATENT DOCUMENTS 0570660  1/1993  European Pat. Off. .......... G10L 5/06

*Primary Examiner*—Kee M. Tung
*Attorney, Agent, or Firm*—Richard C. Litman

[57] ABSTRACT

A language translation system receives audio output from a television, a radio, or some other electronic device designed to present a program to a user, so as to identify any speech signal contained within the audio output. The speech signals are broken down into recognizable phonemes which make up the most basic elements of speech in spoken languages. The sequentially generated phonemes identified from the speech signals are then regrouped so as to form recognizable words in one of a predetermined number of recognizable languages. Sentences are then formed using the grammatical rules of the recognized language so that each sentence may be translated into a universal language, such as Esperanto. The translation system then translates the sentences from Esperanto to the native language of the user as identified by the user.

12 Claims, 1 Drawing Sheet

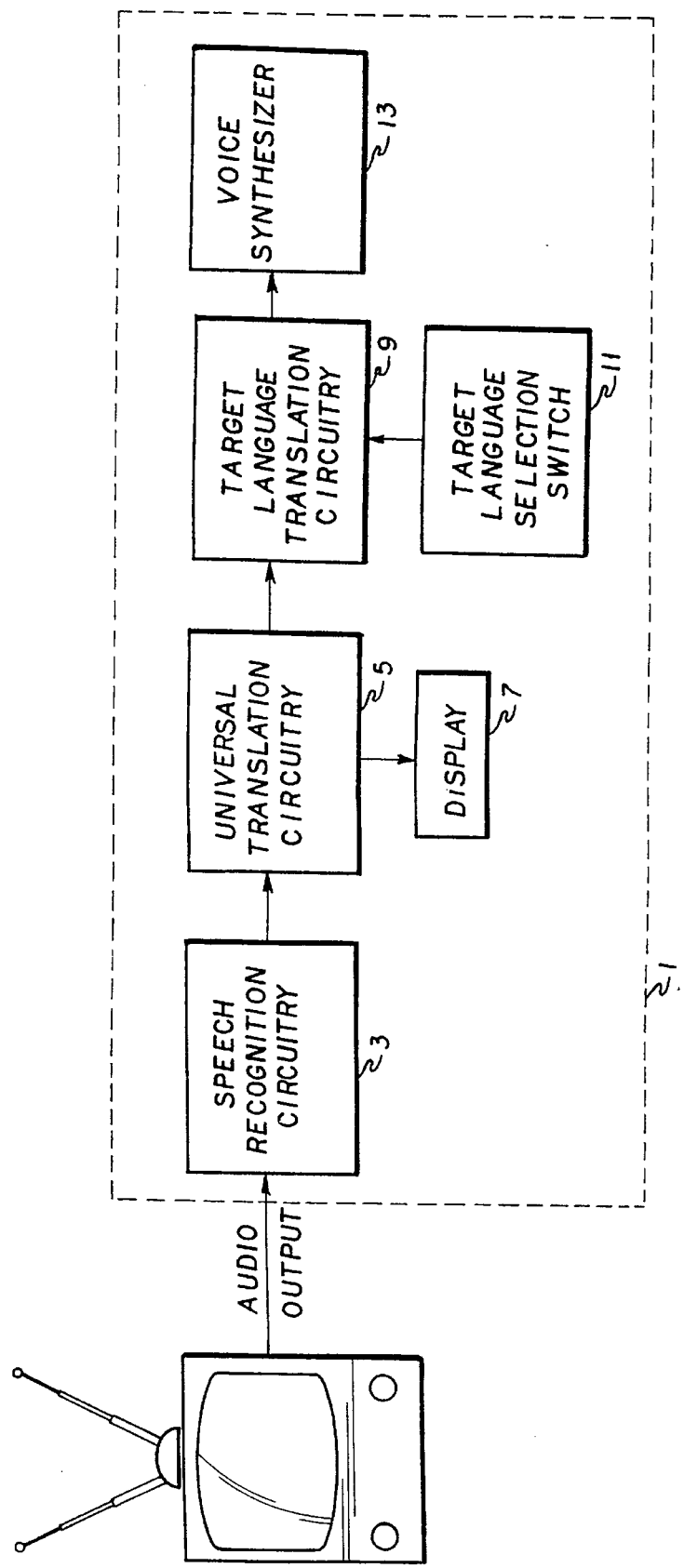

AUTOMATED LANGUAGE TRANSLATION SYSTEM

BACKGROUND OF THE INVENTION

1. FIELD OF THE INVENTION

The present invention relates to voice recognition and translation systems. More particularly, the present invention pertains to those voice recognition systems which are able to translate spoken words of a first language into a machine recognizable code, then translate the machine recognizable code into a second language so as to produce an audible translation of the spoken words from the first language to the second language.

2. DESCRIPTION OF THE PRIOR ART

U.S. Pat. No. 4,481,593 issued Nov. 6, 1984 to Lawrence G. Bahler discloses a speech recognition method and apparatus for recognizing keywords in a continuous audio signal, each keyword being represented by an element template defined by a plurality of target patterns.

U.S. Pat. No. 4,852,170 issued Jul. 25, 1989, to Theodore A. Bordeaux discloses a real time voice recognition circuit using a computer for obtaining a spectrum analysis of continuous speech input thereto so as to determine the frequency content of consecutive speech elements contained within the continuous speech, thereby uniquely identifying each specific phoneme of that speech.

U.S. Pat. No. 4,864,503 issued Sep. 5, 1989, to Bruce G. Tolin discloses a method of using a created international language as an intermediate pathway in the step of translating from a first language to a second language.

European Patent 570,660 published Nov. 24, 1993 by Peter F. Brown et al. discloses a spectrum analyzer to remove background noise.

None of the above inventions and patents, taken either singly or in combination, is seen to describe the instant invention as claimed.

SUMMARY OF THE INVENTION

The device of the present invention allows a user fluent in a particular native language to hear a program in his or her native language while watching a foreign television program, listening to a foreign radio program, watching a foreign movie, talking to a foreigner over the telephone, or watching and/or listening to a prerecorded program from a tape or disc which is presented in a foreign language. The automated language translation system includes a speech recognition circuit to recognize phonemes of speech in a predetermined number of languages. These phonemes are then combined in word groups to form recognizable words in one of the predetermined number of languages. The device then identifies to the user the language in which the program is presented. Further the device automatically translates the program into a selected target language, usually the native language of the user. A switch allows the user to identify the target language.

Accordingly, it is a principal object of the invention to provide an automated language translation system to translate the audio of a television program, radio program, or a reproduced program stored on a recording medium into a language selected by the user.

It is another object of the invention to provide an automated language translation system which can recognize a variety of natural languages.

It is a further object of the invention, to identify to the user the language in which the program is presented.

Still another object of the invention is to allow a user to identify to the translation system his or her native language.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

The FIGURE is an electrical block diagram of the preferred embodiment of the present invention.

DETAILED DESCRIPTION OF THE PREFERRED EMBODIMENT

In the FIGURE, the automated language translation system 1 (in dashed lines) of the present invention includes speech recognition circuitry 3 connected to the audio output of an electronic device, such as a television set as shown, a radio, or any electronic reproduction device, such as a tape player, a disc player, or a reel-to-reel movie projector having a sound track. The system 1 receives the audio signal of a program presented to the user by the electronic device. The speech recognition circuitry 3 is capable of receiving continuous speech information and converting the speech into machine recognizable phonemes. Such a system is disclosed in U.S. Pat. No. 4,852,170 issued Jul. 25, 1989 to Theodore A. Bordeaux made of record and incorporated herein by reference. The speech recognition circuitry 3 also includes a spectrum analyzer to remove background noise as disclosed by European Patent 570,660 published Nov. 24, 1993, by Peter F. Brown et al.

In operation, as illustrated in the FIGURE, the speech synthesizer 3 receives the audio output of a television receiving a broadcast program so as to convert the continuous speech therein into phonemes recognized by the synthesizer 3. Phonemes represent the basic elements of speech which make up words in spoken languages. These phonemes are output in consecutive order by the synthesizer 3 as they are recognized from the continuous speech of the television broadcast program.

Universal translation circuitry 5 receives and stores the phonemes output by speech recognition circuitry 3. The phonemes are combined in consecutive order until recognizable words are formed. Universal translation 5 circuitry includes a table of recognizable words in a specified number of natural languages, wherein in each word is identified by a consecutive number of phonemes.

Universal translation circuitry 5 attempts to group the sequentially received phonemes in various patterns until a predetermined number of consecutive recognizable words are formed. ideally, each grouping pattern forms a word and includes a number of consecutive phonemes grouped from a first phoneme to a last phoneme such that a phoneme preceding the first phoneme of that word forms the end of the preceding word and the phoneme following the last phoneme of that word forms the beginning of the following word. The natural language of the speech of the television broadcast is determined by identifying the natural language to which those words belong. Translation circuitry 5 drives display 7 to identify to the user the particular natural language identified as being the language of the television program being broadcast.

After determining the natural language of the broadcast and combining the consecutively received phonemes into particular groups to form consecutive words, these words are then combined into recognizable sentences in accordance with the grammatical rules of that language. These recognizable sentences are then translated into a universal language and are output by translation circuitry 5 to be received by target language translation circuitry 9. In the preferred embodiment the universal language used is Esperanto. Target language translation circuitry 9 then translates from Esperanto to a particular target language as identified by the target language selection switch 11 set by the user so that voice synthesizer 13 may be used to broadcast the television program in the language selected by the user; of course, this may be the native language of the user. Such a method of using a universal language as the intermediate pathway in the translation from one natural language to another is disclosed by U.S. Pat. No. 4,864,503 issued Sep. 5, 1989 to Bruce G. Tolin, made of record and incorporated herein by reference.

It is to be understood that the present invention is not limited to the sole embodiment described above, but encompasses any and all embodiments within the scope of the following claims. For example, the translation system 1 of the present invention could be utilized by any electronic device which is used to receive a broadcasted program or reproduce a prerecorded program to present that program to the user. Such electronic devices could be, for example, a radio, a video cassette recorder, an audio tape player, a compact audio disc player, a video disc player, or a movie projector having a sound track.

I claim:

1. A language translation system connectable to an audio output of an electronic device for presenting an audible program to a user, said language translation system translating the program audibly in the user selected language, said language translation system comprising:

an audio input connectable to the audio output of the electronic device selected from a television set, a radio, a video cassette recorder, a compact audio disc player, and a movie projector;

speech recognition circuitry connected to said audio input for converting any speech within the audio output of the electronic device into recognizable phonemes;

universal translation circuitry connected to said speech recognition circuitry for grouping the recognized phonemes into recognizable words and sentences in a recognizable natural language so as to translate said recognizable sentences from said natural language into a universal language;

target language translation circuitry connected to said universal translation circuitry for receiving said sentences translated into said universal language so as to translate each of said sentences previously translated into said universal language into a particular one of a plurality of target languages, said target language translation circuitry further having an output;

a target language selection switch connected to said target language translation circuitry for allowing the user to select said particular one of said plurality of target languages; and a voice synthesizer connected to said output of said target language translation circuitry so as to broadcast audible speech which is the translation of said program in said one target language.

2. The language translation system according to claim 1, wherein the electronic device is a television set.

3. The language translation system according to claim 1, wherein the electronic device is a radio.

4. The language translation system according to claim 1, wherein the electronic device is a video cassette recorder.

5. The language translation system according to claim 1, wherein the electronic device is a compact audio disc player.

6. The language translation system according to claim 1, wherein the electronic device is a movie projector.

7. A method of translating an audio signal of a broadcast speech from a natural language of the speech into an audible speech of a user's target language, wherein said natural language belongs to a set of recognizable natural languages, said method comprising the steps of:

identifying speech elements by generating a consecutive number of recognizable phonemes of the speech contained within the audio signal from an electronic device selected from a television set, a radio, a video cassette recorder, a compact audio disc player, and a movie projector;

forming consecutive words by grouping the consecutive number of recognizable phonemes into recognizable consecutive words;

identifying the natural language of the speech by identifying the natural language of the consecutive words formed in said step of forming consecutive words, the natural language of the consecutive words being the natural language of the speech;

forming consecutive sentences by grouping the recognizable consecutive words formed in said step of identifying the natural language, and forming said consecutive words into sentences in accordance with grammatical rules of the natural language of the speech identified; translating into a universal language each consecutive sentence formed in said step of forming consecutive sentences;

identifying a user selected language;

translating into the selected language each consecutive sentence translated into the universal language; and broadcasting said each selected language sentence with a voice synthesizer to the user in the tarqet language.

8. The method according to claim 7, wherein the electronic device is a television set.

9. The method according to claim 7, wherein the electronic device is a radio.

10. The method according to claim 7, wherein the electronic device is a video cassette recorder.

11. The method according to claim 7, wherein the electronic device is a compact audio disc player.

12. The language translation system according to claim 7, wherein the electronic device is a movie projector.

* * * * *